(12) United States Patent
Guido et al.

(10) Patent No.: US 7,475,354 B2
(45) Date of Patent: Jan. 6, 2009

(54) METHOD FOR GENERATING A PORTAL PAGE

(75) Inventors: Patrick R. Guido, Cary, NC (US); Robert C. Leah, Cary, NC (US); Paul F. McMahan, Apex, NC (US); Wayne B. Riley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 10/888,149

(22) Filed: Jul. 9, 2004

(65) Prior Publication Data

US 2006/0010390 A1    Jan. 12, 2006

(51) Int. Cl.
*G06F 3/00* (2006.01)
(52) U.S. Cl. .................. 715/742; 715/745; 709/224
(58) Field of Classification Search .......... 715/742, 715/745; 709/224
See application file for complete search history.

(56) References Cited

U.S. PATENT DOCUMENTS

| | | | | |
|---|---|---|---|---|
| 6,037,935 | A  * | 3/2000 | Bates et al. ............... | 715/760 |
| 6,278,449 | B1 * | 8/2001 | Sugiarto et al. ........... | 715/826 |
| 6,282,547 | B1 | 8/2001 | Hirsch | |
| 7,062,511 | B1 * | 6/2006 | Poulsen .................. | 707/104.1 |
| 2001/0009016 | A1 * | 7/2001 | Hofmann et al. .......... | 709/219 |
| 2002/0052954 | A1 * | 5/2002 | Polizzi et al. ............ | 709/225 |
| 2002/0111848 | A1 * | 8/2002 | White ..................... | 705/10 |
| 2002/0169852 | A1 * | 11/2002 | Schaeck .................. | 709/218 |
| 2003/0023513 | A1 | 1/2003 | Festa et al. | |
| 2003/0126136 | A1 | 7/2003 | Omoigui | |
| 2003/0167315 | A1 * | 9/2003 | Chowdhry et al. .......... | 709/218 |
| 2003/0177127 | A1 | 9/2003 | Goodwin et al. | |
| 2003/0212766 | A1 | 11/2003 | Giles et al. | |
| 2003/0225549 | A1 * | 12/2003 | Shay et al. ............... | 702/182 |
| 2004/0030795 | A1 * | 2/2004 | Hesmer et al. ............ | 709/231 |
| 2004/0054749 | A1 * | 3/2004 | Doyle et al. .............. | 709/217 |
| 2004/0068554 | A1 * | 4/2004 | Bales et al. .............. | 709/218 |
| 2004/0090969 | A1 * | 5/2004 | Jerrard-Dunne et al. ................. | 370/395.54 |
| 2004/0162812 | A1 * | 8/2004 | Lane et al. ............... | 707/3 |
| 2005/0050021 | A1 * | 3/2005 | Timmons .................. | 707/3 |
| 2005/0102383 | A1 * | 5/2005 | Sutler .................... | 709/223 |

OTHER PUBLICATIONS

Published article, "IBM WebSphere Portal Server Product Architecture V2.1", published Nov. 9, 2001, pp. 1-32.*
International Business Machines Corporation, "Multi Web Screen for Intranet User", Research Disclosure, Jun. 2001 pp. 1042-1043.
International Business Machines Corporation, "A Process for the Blending of Web Content", Research Disclosure, Apr. 2000, pp. 778-779.

* cited by examiner

*Primary Examiner*—Weilun Lo
*Assistant Examiner*—Tuyetlien T Tran
(74) *Attorney, Agent, or Firm*—David Irvin; Hoffman Warnick LLC

(57) ABSTRACT

A solution for generating a portal page based on a data item. In particular, one or more portlets are selected from a set of available portlets based on the data item. The selected portlet(s) are then included on the portal page, which can be provided to a user device for display. The data item can be provided to a content provider for the portlet in order to generate the display area for the portlet. Information on the user and/or user device can be used when selecting the one or more portlets for inclusion on the portal page.

7 Claims, 3 Drawing Sheets

METHOD FOR GENERATING A PORTAL PAGE

BACKGROUND OF THE INVENTION

1. Technical Field

The invention relates generally to portal pages, and more particularly to a solution for generating a portal page based on a data item.

2. Background Art

The use of portal pages and portlets have greatly enhanced a user's ability to customize content that is provided over computer networks such as the Internet. As known, a "portal page" is generated at a web "portal" server by portal server software (e.g., WebSphere Portal Server, which is commercially available from International Business Machines Corp. of Armonk, N.Y.). A portal page typically includes one or more sections or visual "portlets" that each contain certain content formatted according to a user's preferences. For example, a user could establish his/her own portal page that has portlets for news, weather and sports. When the portal page is requested by the user, the portal server obtains the desired content from the content provider associated with each portlet. Once obtained, the content is aggregated and uniform resource indicator (URI) references to advertisements and other supplemental content can be inserted into the markup language for display in the appropriate sections as a portal web page. This portal technology has lead to the explosion of personalized "home" pages for individual web users.

To date, the generation of a portal page requires extensive user interaction. For example, the user generally selects one or more desired portlets from a list of available portlets, manually places, sizes, and formats each selected portlet on a portal page, provides any data that may be necessary to obtain desired data for the portlet (e.g., a geographic area for weather information), etc. As a result, the content of a portal page is generally static and cannot be readily created and/or modified on the fly.

Many applications could benefit from the dynamic generation of a web page such as a portal page. For example, a user may monitor the health of a computer network. If a problem occurs on the network, the user may desire additional information such as information on the maintenance history of a problematic hardware item, a schematic of the network configuration, contact information for one or more individuals that can address the problem, etc. However, to date, portal pages have not been able to be readily used in these situations.

As a result, a need exists for an improved solution for generating a portal page. In particular, a need exists for a method, system and program product that select one or more portlets, and generate a portal page that includes the selected portlets based on a data item with no or a reduced amount of required user interaction.

SUMMARY OF THE INVENTION

The invention provides a method, system and program product for generating a portal page. Specifically, under the present invention, a user can select a data item (e.g., a problem network component) that is used to select one or more portlets. The portlets can then be used to generate a portal page, which can be displayed to the user. The portlets can be selected and/or the portal page can be generated automatically, without requiring any interaction from the user. Various additional factors can also be used to generate the portal page. For example, one or more attributes of the user and/or a user device can be used to select a portlet, prioritize portlets, and/or format the portal page. The data item can also be provided to a content provider for one or more of the selected portlets so that the content of the display area allocated to the corresponding portlet can be generated.

A first aspect of the invention provides a computerized method of generating a portal page, the method comprising: providing a display interface to a user device, wherein the display interface displays a set of data items; obtaining a data item selected by a user, the data item corresponding to at least one of: an event on a network or a network component, and the data item including a plurality of attributes, each attribute defining a property of the data item; automatically selecting at least one portlet based on at least one of the plurality of attributes of the data item in response to the obtaining without any interaction from the user, the selected at least one portlet having at least one attribute that matches the at least one of the plurality of attributes of the data item; automatically generating the portal page in response to the selecting the at least one portlet without any interaction from the user, wherein the automatically generated portal page includes the selected at least one portlet; and providing the portal page for display to the user without any interaction from the user.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a method, system and program product for generating a portal page. Specifically, under the present invention, a user can select a data item (e.g., a problem network component) that is used to select one or more portlets. The portlets can then be used to generate a portal page, which can be displayed to the user. The portlets can be selected and/or the portal page can be generated automatically, without requiring any interaction from the user. Various additional factors can also be used to generate the portal page. For example, one or more attributes of the user and/or a user device can be used to select a portlet, prioritize portlets, and/or format the portal page. The data item can also be provided to a content provider for one or more of the selected portlets so that the content of the display area allocated to the corresponding portlet can be generated.

Figure 1:
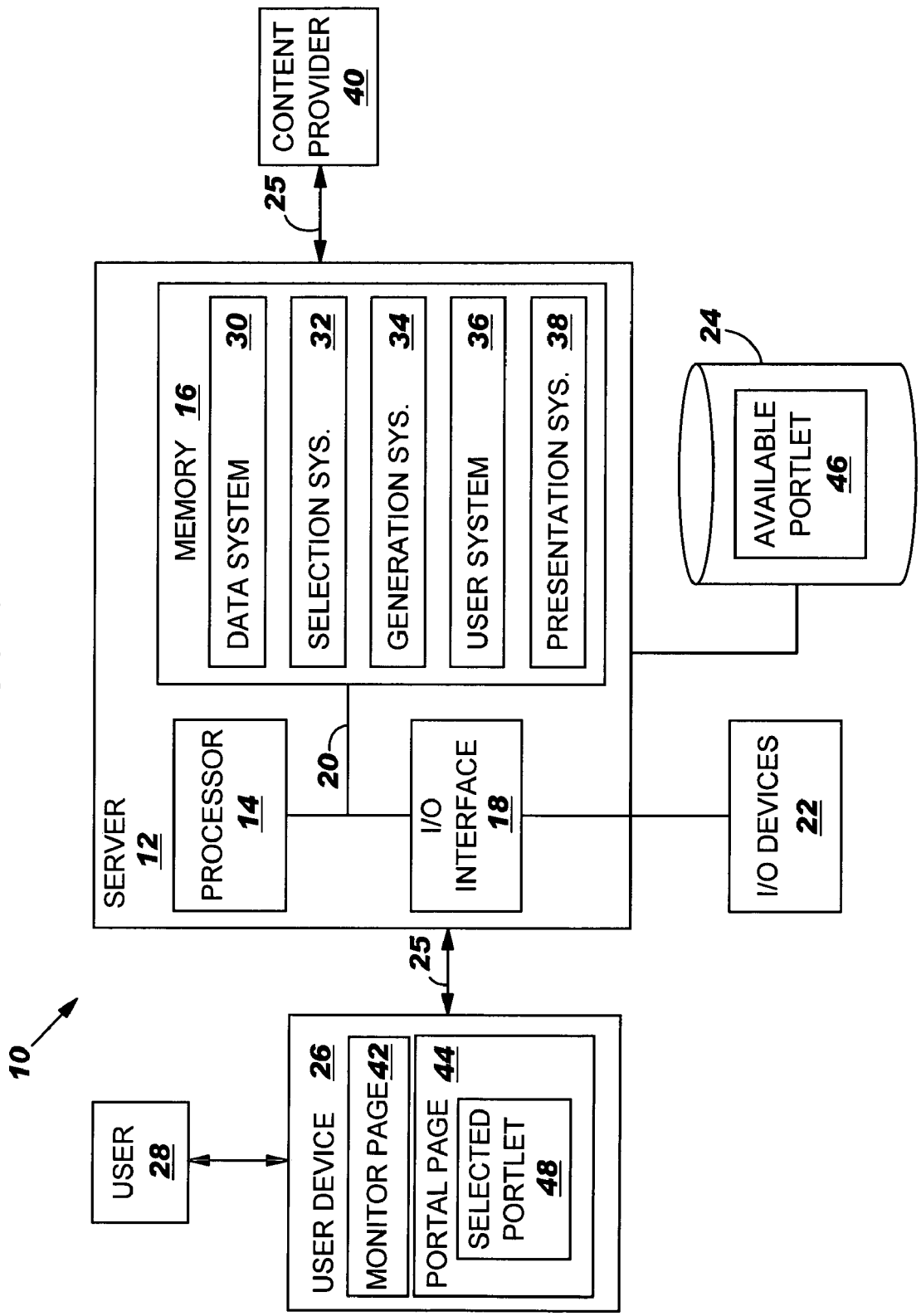
FIG. 1 shows an illustrative system for generating a portal page.

Turning to the drawings, FIG. 1 shows an illustrative system 10 for generating a portal page 44. In general, a user 28 can view one or more data items on a monitor page 42 that is displayed on a user device 26. User 28 can select one or more of the data items, which are provided to server 12 and then used to obtain a set (one or more) of selected portlets 48 from a set of available portlets 46. The selected portlet(s) 48 are then used to generate a portal page 44, which can be provided to user device 26 for displaying to user 28. Further, the data item(s) can be provided to a content provider 40 for each selected portlet 48 so that the display area for each selected portlet 48 can be generated appropriately.

Communications between user device 26, server 12, and/or content provider 40 can occur over one or more networks 25. To this extent, network 25 can comprise any type of communications link. For example, network 25 can comprise an addressable connection in a client-server (or server-server) environment that may utilize any combination of wireline and/or wireless transmission methods. In this instance, user device 26, server 12, and/or content provider 40 may utilize conventional network connectivity, such as Token Ring, Ethernet, WiFi or other conventional communications standards. Further, network 25 can comprise any type of network or combination of network types, including the Internet, a wide area network (WAN), a local area network (LAN), a virtual private network (VPN), etc. Where user device 26 communicates with server 12 via the Internet, connectivity could be provided by conventional TCP/IP sockets-based protocol, and user device 26 could utilize an Internet service provider to establish connectivity to server 12.

As shown, server 12 generally includes a processor 14, a memory 16, an input/output (I/O) interface 18, a bus 20, external I/O devices/resources 22, and a storage unit 24. Processor 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Storage unit 24 may comprise any type of data storage for providing storage for information necessary to carry out the invention as described below. As such, storage unit 24 may include one or more storage devices, such as a magnetic disk drive or an optical disk drive. Moreover, similar to processor 14, memory 16 and/or storage unit 24 may reside at a single physical location, comprising one or more types of data storage, or be distributed across a plurality of physical systems in various forms. Further, memory 16 and/or storage unit 24 can include data distributed across, for example, a LAN, WAN or a storage area network (SAN) (not shown).

I/O interface 18 may comprise any system for exchanging information to/from one or more external I/O devices 22. I/O devices 22 may comprise any known type of external I/O device for interacting with one or more computing devices and/or one or more individuals. Bus 20 provides a communication link between each of the components in server 12 and likewise may comprise any known type of transmission link, including electrical, optical, wireless, etc. In addition, although not shown, additional components, such as system software, may be incorporated into server 12.

Further, it is understood that server 12 comprises any type of computing device capable of communicating with one or more other computing devices (e.g., user device 26). Similarly, user device 26 and/or content provider 40 can comprise any type of computing device, such as a server, a desktop computer, a laptop, a handheld device, a mobile phone, a pager, a personal data assistant, etc. To this extent, user device 26 and/or content provider 40 will typically include the same elements as shown in server 12 (e.g., processor, memory, I/O interface, etc.). These have not been separately shown and discussed for brevity. It is understood, however, that if, for example, user device 26 is a handheld device or the like, a display could be contained within user device 26, and not as an external I/O device 22 as shown for server 12.

Server 12 is shown including various systems implemented as a computer program product and stored in memory 16. In general, data system 30 can obtain a data item, and selection system 32 can select one or more portlets 48 from set of available portlets 46 based on the data item. Generation system 34 can generate portal page 44 based on the selected portlets 48 and the data item. User system 36 can obtain user information based on user 28 and/or device information based on user device 26 that can be used in selecting portlets 48 and/or generating portal page 44. Presentation system 38 can provide the generated portal page 44 to user device 26. It is understood that some of the various systems shown in FIG. 1 can be implemented independently, combined, and/or stored in memory for one or more separate servers 12 that communicate over a network. Further, it is understood that some of the systems and/or functionality may not be implemented, or additional systems and/or functionality may be included as part of system 10.

In any event, as discussed above, the invention generates portal page 44 based on one or more data items. A data item can comprise any type of data, and in particular, data that can be displayed in a tabular form. For example, the data item could comprise data pertaining to an event that occurred, one or more properties of an object, etc. It is understood that data items can comprise a wide range of types and formats. In one embodiment described further below, each data item comprises data pertaining to an event that occurred on a computer network. It is understood that this example is only illustrative of the numerous applications and types of data for which the present invention can be applied and the invention is not limited to this particular application.

Figure 2:
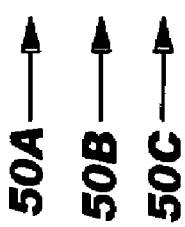
FIG. 2 shows an illustrative monitor page.

As previously noted, the one or more data items can be obtained by data system 30. The data item(s) can be provided by another computer system (e.g., user device 26), generated by a computer program, etc. In one embodiment, the data item(s) are selected by user 28 using a display interface that is displayed by user device 26. For example, the display interface can comprise a table of data. FIG. 2 shows an illustrative monitor page 42 that displays information on a set (one or more) of data items 50A-C in tabular form. As shown, each data item 50A-C comprises data regarding an event that occurred on a computer network. For example, data item 50A comprises data regarding the failure of a database (DB) server. In general, data system 30 (FIG. 1) can generate monitor page 42, and presentation system 38 (FIG. 1) can provide the monitor page 42 to user device 42 for display to user 26. Should changes to the data item(s) be necessary, data system 30 can update monitor page 42 accordingly.

When displayed by user device 26 (FIG. 1), user 28 (FIG. 1) can be allowed to select one or more of the set of data items 50A-C. When a data item 50A-C is selected by user 28, user device 26 can provide the selected data item(s) 50A-C to data system 30 (FIG. 1). For example, user 28 could highlight data item 50A on monitor page 42, and double-click a pointing device. In response, user device 26 can provide data item 50A to data system 30 for further processing. It is understood that user device 26 could provide all of the attributes displayed for data item 50A or a portion of the attributes. For example, user device 26 could provide the event identifier (ID) for data item 50A and data system 30 could obtain from another data source any additional attributes that may be required using the event ID.

Returning to FIG. 1, data system 30 can provide the selected data item 50A (FIG. 2) to selection system 32, which can generate a set of selected portlets 48 for inclusion in portal page 44. For example, selection system 32 can select one or more portlets from set of available portlets 46 based on data item 50A. In particular, one or more attributes of data item 50A can be compared with attributes that determine whether an available portlet 46 may be desired to be viewed by user 28. In the example above, attributes of data item 50A could comprise "resource=server," "type=database," "time=8:00 AM," "priority=critical," etc. In this case, available portlets 46 having the attribute "resource=server" could be initially selected while available portlets 46 having the attribute "resource=client" would not be selected. Similarly, a portlet 46 having an attribute "time=evening" also would not be selected.

It is understood that the one or more attributes of data item 50A that are used to select portlet(s) from available portlets 46 can be combined in any logical manner. For example, selection system 32 could select each available portlet 46 having attributes of "resource=server and priority=critical" or attributes of "resource=server or priority=critical." Further, the comparison and attributes can be formatted in any appropriate language. For example, when network 25 (FIG. 1) comprises the Internet or the like, an extensible markup language (XML) schema can be defined and used. To this extent, attributes of data item 50A can be provided in XML and an XPath expression can be associated with each available portlet 46. In this case, the attributes can be readily compared to the XPath expression to determine if there is a match.

A portlet can be selected from set of available portlets 46 using additional information other than attributes of data item 50A (FIG. 2). For example, a user system 36 can obtain user information for user 28 and/or device information for user device 26. The user information and/or device information can then be used in selecting portlet(s) from set of available portlets 46. For example, user information could comprise a user ID, a permission level, a job responsibility, etc. Similarly, device information can comprise various information on a display area/resolution, a communication bandwidth, a physical location, etc. In any event, user information and/or device information can be compared to attributes that determine the selection of one or more available portlets 46 in the same manner as discussed above with reference to data item 50A.

Figure 3:
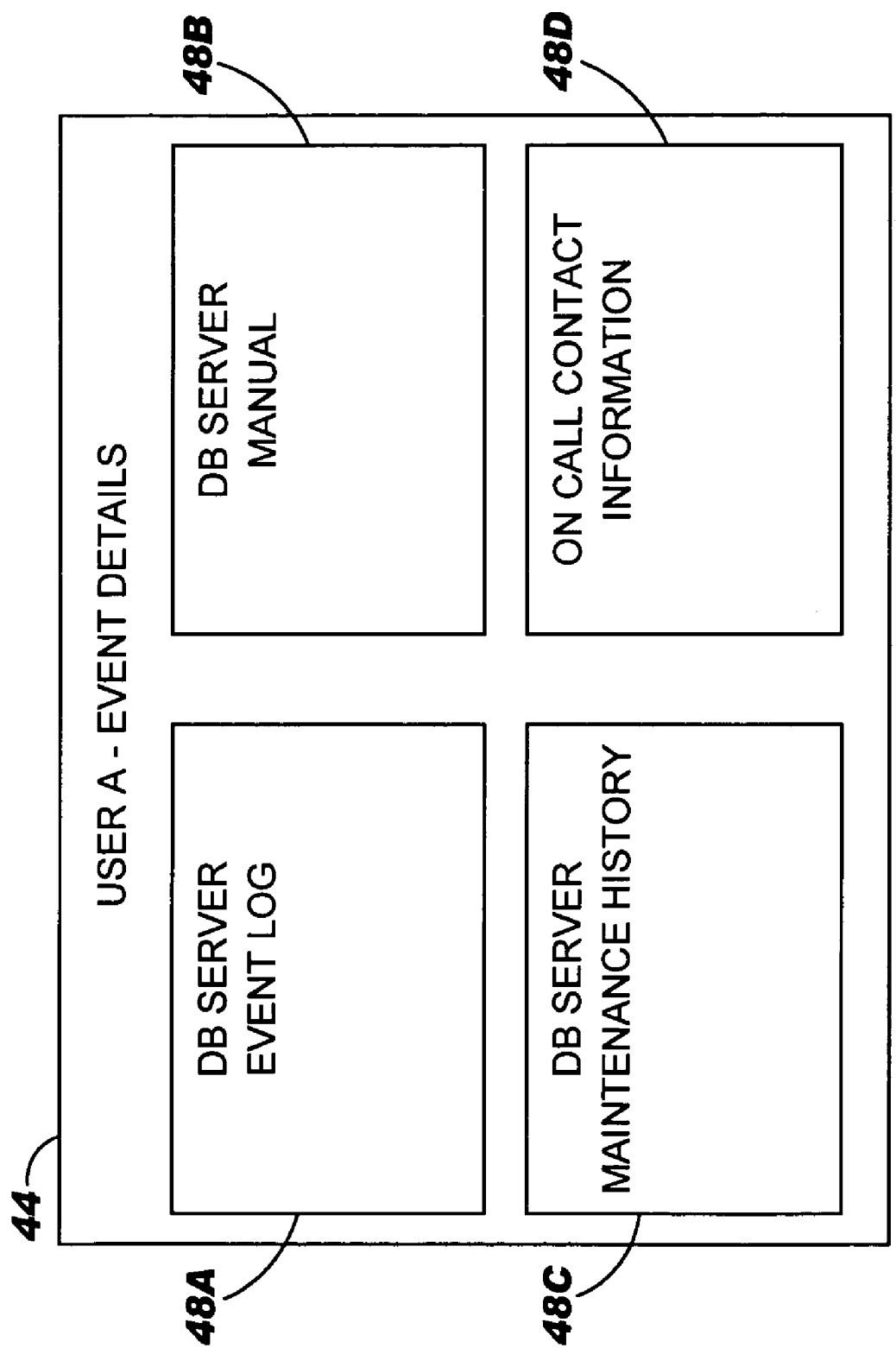
FIG. 3 shows an illustrative portal page.

Selection system 32 can provide selected portlets 48 to generation system 34, which can generate portal page 44 that includes one or more selected portlets 48. FIG. 3 shows an illustrative portal page 44 that includes four selected portlets 48A-D that were selected based on data item 50A (FIG. 2). Generation system 34 (FIG. 1) can automatically generate portal page 44 using the selected portlets provided by selection system 32 (FIG. 1). To this extent, generation system 34 can automatically configure a layout of portal page 44. In one embodiment, generation system 34 can allocate a size of each selected portlet 48A-D based on a quantity of selected portlets 48A-D and a display area of user device 26 (FIG. 1). Additionally, one or more selected portlets 48A-D could specify a desired/required minimum display area, a desired display location, etc., which can be accommodated by generation system 34, if possible.

In one embodiment, selection system 32 (FIG. 1) can assign a priority to the selected portlets 48A-D that are provided to generation system 34 (FIG. 1). The priority could be based on, for example, a number of attributes that matched data item 50A (FIG. 2), user information, and/or device information. In any event, generation system 34 can then automatically determine the location and/or size of selected portlets 48A-D based on the assigned priority. Further, generation system 34 could only include a portion of selected portlets 48A-D in portal page 44. For example, selection system 32 could provide five selected portlets 48A-D. However, generation system 34 could limit the number of selected portlets 48A-D included on portal page 44 to four based on, for example, a display area for user device 26 (FIG. 1). In this case, generation system 34 could select the four selected portlets 48A-D having the highest priority.

Once portal page 44 has been generated, generation system 34 (FIG. 1) can provide any necessary data to a content provider 40 (FIG. 1) for each selected portlet 48A-D. For example, selected portlets 48A-C could require one or more attributes of data item 50A (FIG. 2) in order to generate a display area for each selected portlet 48A-C, while selected portlet 48D may also require user information and/or device information to generate the display area for selected portlet 48D. In any event, each content provider 40 will generate the display area for the corresponding selected portlet 48A-D as is known in the art. Returning to FIG. 1, once portal page 44 has been generated, presentation system 38 can provide portal page 44 to user device 26 for displaying portal page 44 to user 28. Subsequently, user 28 can use portal page 44 and one or more selected portlets 48 to acquire additional data, request another data item that will cause another portal page 44 to be automatically generated, etc.

In one embodiment of the invention, the selected portlet(s) 48 and portal page 44 are generated automatically, without any interaction from user 28 or another user. However, it is understood that some user interaction could be included when generating portal page 44. For example, selection system 32 could present user 28 with the set of selected portlets 48, and user 28 could add/remove portlets before portal page 44 is generated. Further, generation system 34 could allow user 28 to select a location and/or size of selected portlets 48 within portal page 44. To this extent, user 28 can be allowed to add, remove, and/or resize selected portlets 48 after portal page 44 has been automatically generated and provided to user device 26.

Still yet, it should be appreciated that the teachings of the present invention could be offered as a business method on a subscription or fee basis. For example, server 12 could be created, maintained, supported, and/or deployed by a service provider that offers the functions described herein for customers. That is, a service provider could offer to generate portal pages for a customer as described above. It is understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computerized method of generating a portal page, the method comprising:
   providing a display interface to a user device, wherein the display interface displays a set of data items;
   obtaining a data item selected by a user, the data item corresponding to at least one of: an event on a network or a network component, and the data item including a plurality of attributes, each attribute defining a property of the data item;
   automatically selecting at least one portlet based on at least one of the plurality of attributes of the data item in response to the obtaining without any interaction from the user, the selected at least one portlet having at least one attribute that matches the at least one of the plurality of attributes of the data item;
   automatically generating the portal page in response to the selecting the at least one portlet without any interaction from the user, wherein the automatically generated portal page includes the selected at least one portlet; and
   providing the portal page for display to the user without any interaction from the user.

2. The method of claim 1, further comprising obtaining user information for the user, wherein the selecting is further based on the user information.

3. The method of claim 1, further comprising obtaining device information for a user device, wherein the selecting is further based on the device information.

4. The method of claim 1, wherein the obtaining comprises: receiving the data item from the user device.

5. The method of claim 1, further comprising providing at least one of the plurality of attributes of the data item to a content provider for the at least one portlet.

6. The method of claim 1, wherein the automatically generating includes automatically allocating a size for each of the at least one portlet based on a display area for the portal page and a quantity of the at least one portlet.

7. The method of claim 1, wherein the selecting includes assigning a priority to each of the at least one portlet, and wherein the generating includes limiting a total number of portlets included on the portal page.

* * * * *